(No Model.)
G. S. COLBURN.
RATTAN SCRAPING MACHINE.
No. 277,235. Patented May 8, 1883.
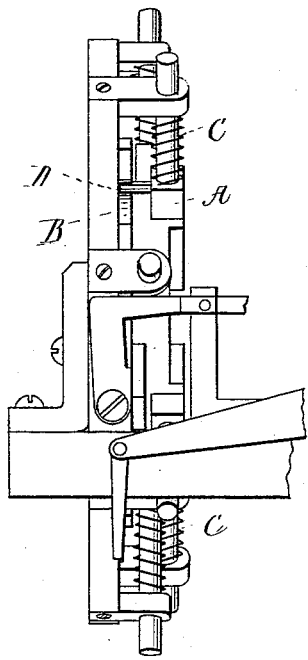
Fig. 2.
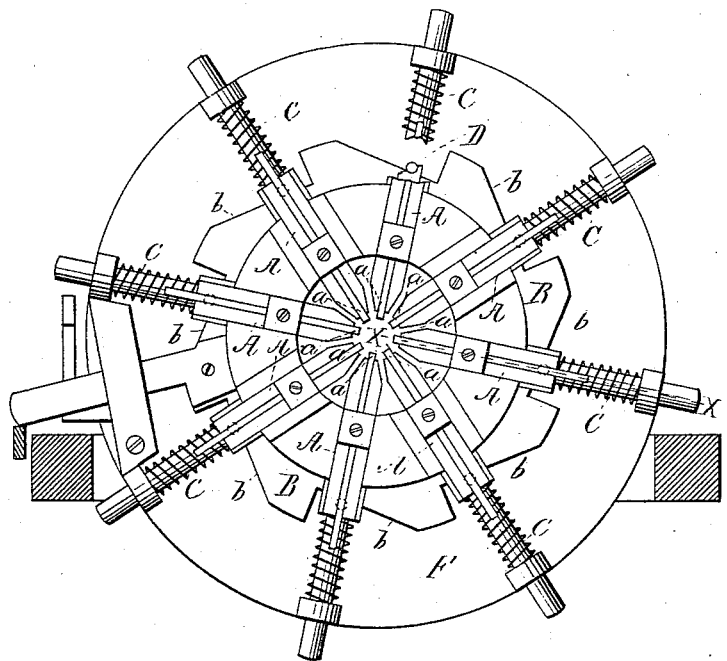
Fig. 1.
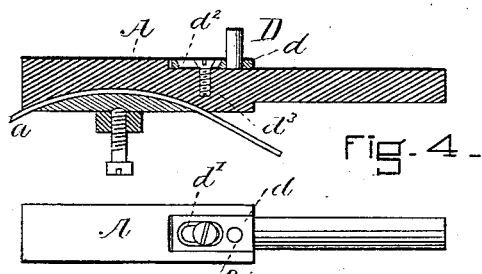
Fig. 4.
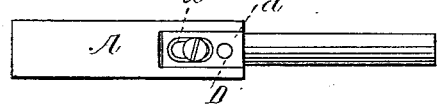
Fig. 5.
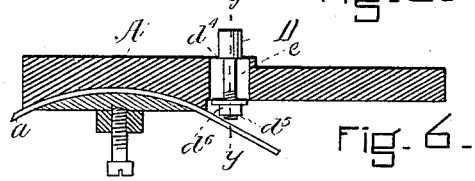
Fig. 6.
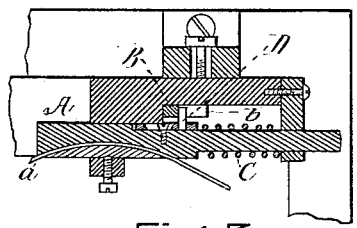
Fig. 3.
Fig. 7.
WITNESSES
Willard C Fogg
Fred. Harris
INVENTOR
Geo. S. Colburn
by his attys
Clarke & Raymond

UNITED STATES PATENT OFFICE.

GEORGE S. COLBURN, OF GARDNER, MASSACHUSETTS.

RATTAN-SCRAPING MACHINE.

SPECIFICATION forming part of Letters Patent No. 277,235, dated May 8, 1883.

Application filed October 19, 1882. (No model.)

*To all whom it may concern:*

Be it known that I, GEORGE S. COLBURN, of Gardner, in the county of Worcester, in the State of Massachusetts, a citizen of the United States, have invented an Improvement in Rattan-Scraping Machines, of which the following is a full, clear, and exact description, reference being had to the accompanying drawings, forming a part of this specification, in explaining its nature, in which—

Figure 1 is a front elevation of the portion of the machine containing my invention. Fig. 2 is a left side elevation. Fig. 3 is a section upon the line $x\ x$ of Fig. 2. Fig. 4 is an enlarged section of the knife-holding block and adjustable cam-pin detached from the machine. Fig. 5 is a plan view thereof. Fig. 6 is a section like that shown in Fig. 4, with the exception that the cam-pin is shown adjustable in a slightly-different way; and Fig. 7 is a section on the line $y\ y$ of Fig. 6.

This invention is an improvement upon a portion of that described in my Letters Patent No. 229,720, dated November 18, 1879. In said Letters Patent I show and describe as a part of the invention mechanism for scraping rattan or cane. This mechanism consists in a series of scraping-knives, which are arranged to converge in front of a hole or passage in the disk or plate to which the knife-supporting blocks are secured, and upon which they have an opening and closing movement; and this disk or plate also carries another disk having a series of cam-surfaces arranged tangentially thereon, and each of which is adapted to engage with a cam-pin attached to a knife-holding block. The revolution of this disk in one direction opens or separates the knives by moving the knife-blocks outwardly, the tangential cams acting upon the cam-pins and against the pressure of suitable springs, and the reverse revolution of the cam-pins allows the springs to return to the knife-blocks, and consequently the knives upon the end of the cane or rattan, which meanwhile has been fed forward between them. In said patent I describe means for revolving the cam-disk, holding it in a certain position, and releasing it and returning it, whereby the knife-blocks are opened, held open, and automatically closed upon the end of the cane, and such mechanism need not be described here. In this patent, however, no mechanism is shown or described for varying the relative position of the knife-supporting blocks and the cam, and consequently it was a matter of very nice adjustment to properly arrange the cam-pins. By, however, making the cam-pins adjustable, I find that the cost of construction is very materially decreased, and that the machine works to better advantage, in that less care is necessary in locating the knife-holding plate or disk, and the knives can always be centered to register with the feedway of the machine, and can be adjusted to small or large cane, as circumstances may require, by making a new knife-block and new cam-pin, or by taking out the old cam-pin, boring another hole, and resetting it—a manifestly expensive and unmechanical expedient; and my present invention relates to means for adjusting the cam-pins so that the position of the knives and knife-blocks in relation to the cane may be varied to any desired extent. This I accomplish by forming in each of the knife-blocks a recess in which the cam-pin is adjusted or moved.

Referring to the drawings, A is each knife-block; $a$, its knife; B, the disk, which is adapted to be partially revolved; $b$, the tangential cam-surface thereon; C, the spring for holding each knife to its work, and for automatically returning the disk to its normal position. D are the cam-pins. Each cam-pin is secured to the plate $d$, having the slot $d'$, and the plate $d$ is secured in the recess $d^2$ of the knife-block by means of a screw, $d^3$, which passes through the slot, and whose head bears on the plate and locks it in any given position.

It will readily be seen that by loosening the screw the cam-plate can be moved in either direction for the purpose of adjustment. This is one form of construction; but it is not so preferable as the form shown in Figs. 6 and 7, because it necessitates the removal of the knife-block from its holder in order to make the adjustment.

Referring to Figs. 6 and 7, it will be seen that the knife-block is provided with a slot, $e$, extending through it, and that the cam-pin extends through said slot, and above the upper surface of the block has the shoulder $d^4$, which bears against the under surface of the block, and a screw-thread, $d^5$, upon its upper end, whereby, in connection with the nut or nut and washer $d^6$, it is locked to the knife-block. Of course by loosening the nut the pin can be moved in the slot as desired.

This improvement is of great value, because it is often necessary to adjust the knives to the cane, as it varies in size, and also because the blocks can be, in the first instance, much more quickly adjusted in their proper places, and also because it is not necessary to use great care in locating the knife-block-supporting plate F.

Having thus fully described my invention, I claim and desire to secure by Letters Patent of the United States—

1. In a rattan-scraping machine, the combination of the knife-holding block A, the cam B, for moving the same, and the adjustable cam-pin D, all substantially as and for the purposes described.

2. The combination, in a rattan-scraping machine, of the knife-block A and its knife $a$, the cam-disk B, the spring C, and the adjustable cam-pin D, all substantially as and for the purposes described.

3. The combination, in a rattan-scraping machine, of the knife-block A, the cam-pin D, and means for adjusting the position of the cam-pin in the knife-block, all substantially as and for the purposes described.

4. The combination of the knife-block A, having the slot $e$, the cam-pin having the shoulder $d^4$ and screw-thread $d^5$, and the nut or nut and washer $d^6$, all substantially as and for the purposes described.

5. In a rattan-scraping machine, the combination of the disk-plates F, supporting the knife-blocks A, and having a central opening, cams for controlling the movements of said knife-blocks, and means, substantially as set forth, for adjusting said blocks in relation to the cams, all substantially as and for the purposes described.

GEO. S. COLBURN.

Witnesses:
F. F. RAYMOND, 2d,
WILLARD C. FOGG.